United States Patent [19]

Love

[11] Patent Number: 5,765,902

[45] Date of Patent: Jun. 16, 1998

[54] CLAMPING DEVICE

[75] Inventor: Dale Love, Nappanee, Ind.

[73] Assignee: Grrreat Creations, Inc., Nappanee, Ind.

[21] Appl. No.: 560,306

[22] Filed: Nov. 17, 1995

[51] Int. Cl.$^6$ ............................. B60P 3/37; A44B 21/00
[52] U.S. Cl. .................... 296/100; 296/167; 248/228.1; 248/316.6; 403/290; 269/249
[58] Field of Search ........................... 296/100, 164, 296/167, 35.3, 240, 249; 248/228.1, 226.11, 230.9, 230.5, 316.6; 403/290, 373

[56] References Cited

U.S. PATENT DOCUMENTS

| | | | |
|---|---|---|---|
| 2,399,714 | 5/1946 | Wasilewski | 269/249 |
| 2,693,386 | 11/1954 | Renfroe | 269/249 X |
| 4,846,431 | 7/1989 | Pflieger | 248/228.1 |
| 4,901,963 | 2/1990 | Yoder | 269/249 X |
| 4,953,820 | 9/1990 | Yoder | 248/231.5 |
| 5,090,670 | 2/1992 | Yang | 269/249 |
| 5,131,780 | 7/1992 | Love | 403/290 |
| 5,228,739 | 7/1993 | Love | 296/100 |
| 5,586,373 | 12/1996 | Edy et al. | 403/290 X |

*Primary Examiner*—Joseph D. Pape
*Attorney, Agent, or Firm*—Baker & Daniels

[57] ABSTRACT

A clamping device for securing a removable truck cap to the cargo bed of a truck to inhibit horizontal slippage of the cap relative to the truck bed. The device has two clamping members and a clamping pad which interlocks with the truck cap. The clamping members compress the clamping pad to hold the truck cap against the truck cargo bed wall.

11 Claims, 5 Drawing Sheets

CLAMPING DEVICE

The present invention relates to a clamping device for securing a removable truck cap to the cargo bed of a truck.

BACKGROUND OF THE INVENTION

Removable truck caps are commonly secured to pick-up trucks and other vehicles with opened cargo beds by clamping the truck cap frame to the truck bed. Heretofore, the clamps secured the cap in position by providing opposing vertical forces through clamping parts which engaged flanges extending from the cap frame and the truck bed wall. This method of attachment is sometimes ineffective to prevent horizontal movement of the truck cap when the truck cap rear hatch is slammed shut.

SUMMARY OF INVENTION

The present invention inhibits horizontal movement of the truck cap by providing a clamp with an engagement portion which engages the sidewall of the truck bed and a clamping pad which mates with the clamp and interlocks with the truck cap frame. In this clamping configuration, the mating connection between the clamping pad and the clamp, the interlocking connection between the pad and the truck cap frame, and the engagement of the engagement portion with the truck bed wall cooperate to inhibit horizontal movement of the truck cap. Accordingly, the cap will remain firmly secured to the truck bed.

This and other advantages of the present invention will become apparent from the following description with reference to the accompanying drawings.

DETAILED DESCRIPTION OF THE INVENTION

Figure 1:
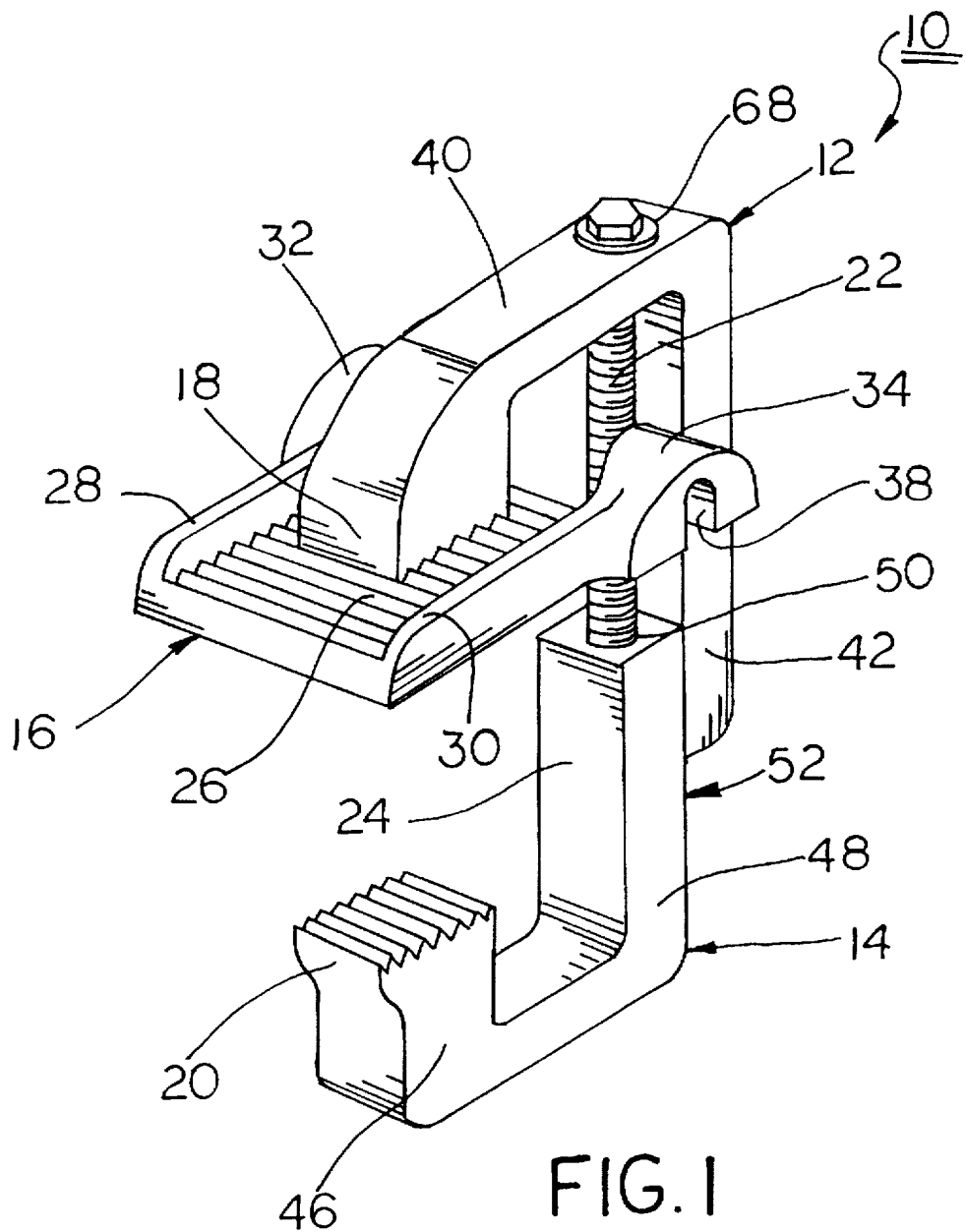
FIG. 1 is a perspective view of the clamping device of the present invention.

Referring now to the drawings, particularly FIG. 1, a clamping device generally referred to by the numeral 10, includes two clamping members 12,14 and a clamping pad 16. Clamping members 12,14 include clamping parts 18,20 respectively, and are adjustably connected by a threaded rotatable adjustment fastener 22, such as a bolt. Clamping member 14 also includes a truck bed engagement portion 24 that engages the side of the truck bed as will hereinafter be explained. Clamping pad 16, preferably made from a resilient material such as rubber or plastic, includes a clamping part mating surface 26, recessed between flanges 28,30, and a pair of frame engaging fingers 32,34 which define coaxial channels 36,38, respectively. Mating surface 26 comprises a plurality of ridges with substantially triangular cross-sections which inversely correspond to similar cross-sections defined by engagement surface 70 of clamping part 18 as is most clearly illustrated in FIG. 1.

Clamping member 12 is substantially L-shaped having a clamp arm 40 and a lever arm 42. Clamping part 18 extends from the outermost end of clamp arm 40. Clamp arm 40 has a bore 44 extending therethrough which receives rotatable adjustment fastener 22. Clamping member 14 is substantially U-shaped having a first leg 46 and a second leg 48. Clamping part 20 extends from the outermost end of first leg 46. The truck bed engagement portion 24 is carried on second leg 48, and a bore 50 extends axially into second leg 48. Bore 50 is threaded to receive a rotatable threaded fastener 22. Engagement portion 24 also includes a coacting surface 52 which, when clamping members 12,14 are connected by fastener 22, slidably coacts with lever arm 42 in the direction of adjustment of fastener 22.

Figure 2:
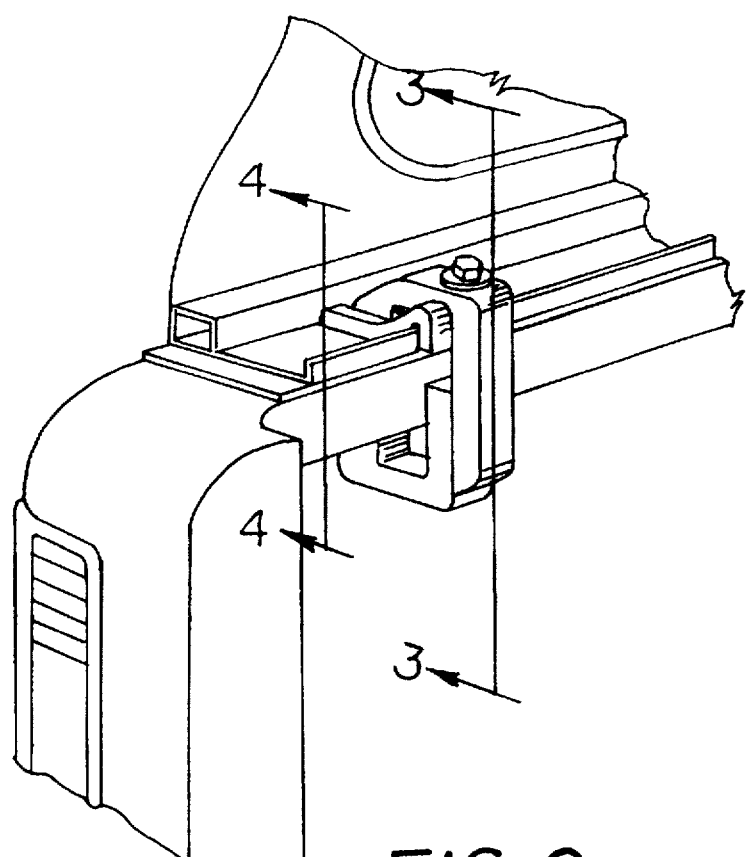
FIG. 2 is a perspective view illustrating a typical application of the clamping device described herein to a truck cap.
Figure 3:
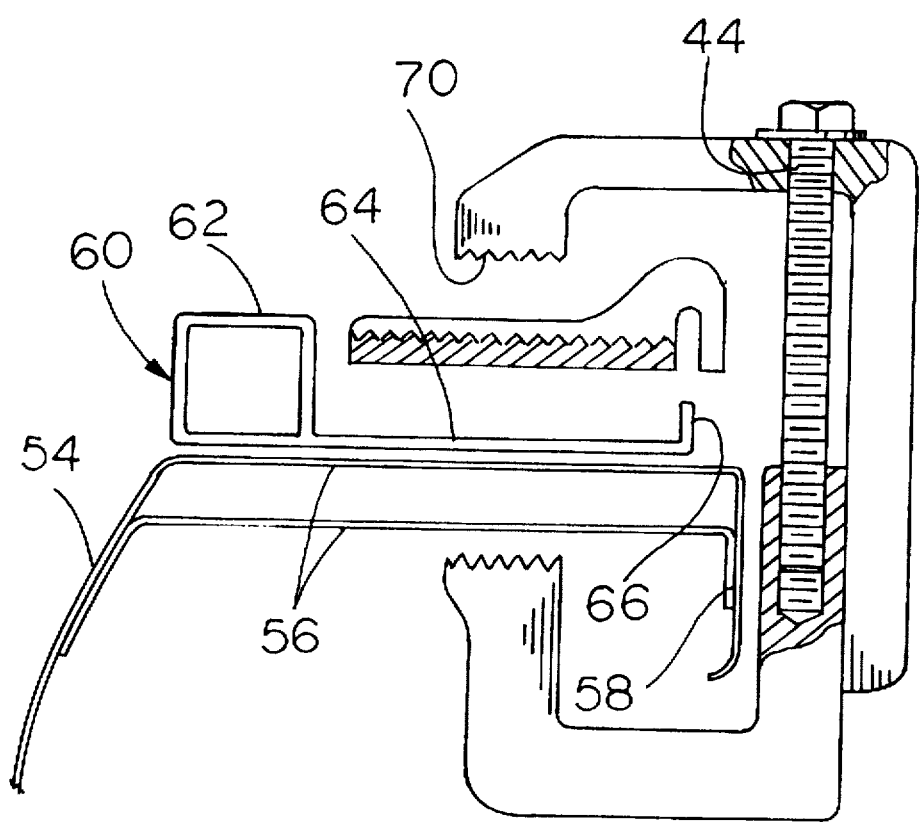
FIG. 3 is an exploded, cross-sectional view taken substantially along lines 3—3 of FIG. 2.
Figure 4:
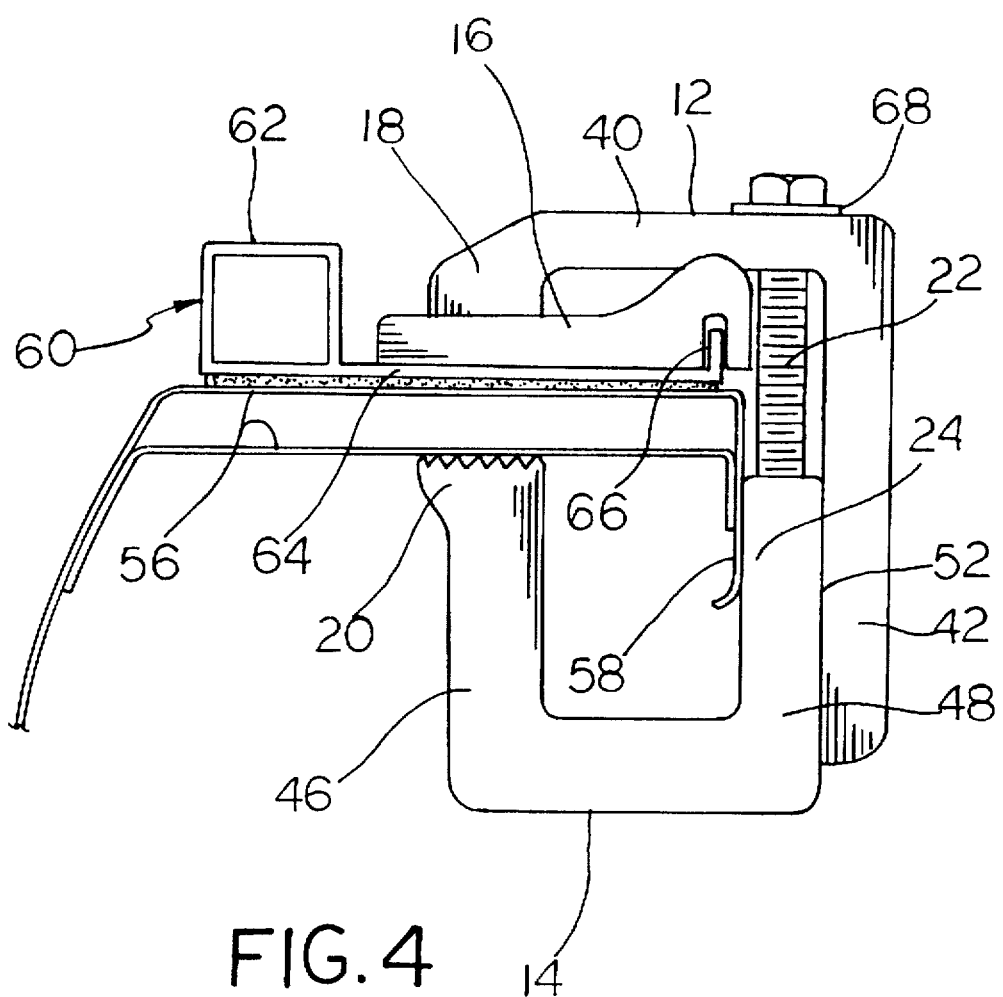
FIG. 4 is a cross-sectional view taken substantially along lines 4—4 of FIG. 2.
Figure 5:
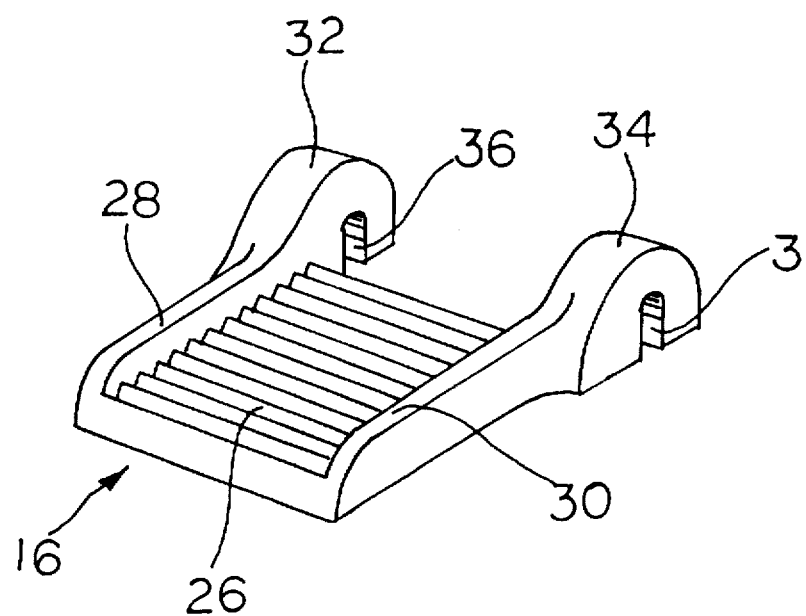
FIG. 5 is a perspective view of the clamping pad of the present invention.

Referring now to FIGS. 2 and 3, a conventional pick-up truck bed includes a side wall 54 which has a ledge portion 56 extending inwardly from the side wall 54. Ledge portion 56 includes a downturned flange 58. A conventional pick-up truck cap includes a frame generally designated 60, extending around the lower perimeter of the cap, comprising a bar 62, a clamping or support flange 64, and an upturned lip 66.

Mode of Operation

Truck cap 60 is installed by positioning clamping flange 64 on top of ledge portion 56. Clamping pad 16 is then positioned on clamping flange 64 so that frame engaging fingers 32,34 receive upturned lip 66. Clamping member 14 is positioned such that clamping part 20 contacts an area of the underside of ledge portion 56 directly below clamping pad 16, and engagement portion 24 contacts downturned flange 58. Clamping member 12, attached to clamping member 14 by fastener 22 with lever arm 42 contacting coacting surface 52, is positioned to contact clamping pad 16. As fastener 22 is rotated downwardly into bore 50, head 68 of fastener 22 engages clamp arm 40, drawing clamping member 12 downwardly toward clamping member 14. Eventually, clamping part 18 is drawn into contact with mating surface 26 of clamping pad 16.

Final tightening of fastener 22 causes opposing forces to be applied by clamping part 18 and clamping part 20 whereby engagement surface 70 of clamping part 18 is compressed into and slightly deforms mating surface 26. Since the pad 16 is made out of a resilient material, such as hard rubber, the pad 16 is compressed slightly so that the pad is held in tight frictional engagement with flange 64 when the pad is clamped by clamp 10. Lever arm 42 is consequently forced against coacting surface 52. This force against coacting surface 52 causes engagement portion 24 to engage downturned flange 58.

In operation, when horizontal forces are imparted to the truck cap, thereby urging it to shift horizontally out of position relative to the truck bed, the clamping force between clamping part 18, through clamping pad 16, and clamping part 20 inhibits such shifting by providing a friction connection between clamping flange 64 and ledge portion 56. Also, the interlocking connection between channels 36,38 and upturned lip 66 inhibits horizontal slippage of the cap relative to clamping pad 16. Additionally, the mating connection between engagement surface 70 of clamping part 18 and mating surface 26 of clamping pad 16 inhibits slippage of clamping pad 16 relative to clamping part 18. Finally, since engagement portion 24 of clamping member 14 is in contact with downturned flange 58 of truck bed wall, clamping device 10, including clamping part 18, is prevented from slipping horizontally relative to the truck bed wall.

I claim:

1. A clamp comprising:

a pair of clamping members;

a pair of clamping shoes, each of said shoes being mounted on one of said members such that the clamping shoe of one member opposes the clamping shoe of the other member;

adjustable fastening means interconnecting said members for moving the members relative to one another whereby adjustment of the fastening means moves the clamping shoes toward and away from one another; and a clamping pad between said shoes said shoes being also movable relative to the clamping pad in a direction transverse to the movement of said clamping shoes toward and away from one another.

2. Clamp as set forth in claim 1, wherein said clamping pad includes a gripping surface engaged by one of said clamping shoes.

3. Clamp as set forth in claim 1, wherein said pad defines a channel for receiving a portion of a member could be engaged by the pad, for locating the pad relative to said member.

4. Clamp as set forth in claim 1, wherein said pad includes a pair of fingers extending outwardly from the pad, and a co-axial channel defined by said fingers for engaging a projecting portion of the member engaged by said pad.

5. A clamp for securing a removable truck cap to a bed of a pick-up truck, said bed including a ledge supporting said truck cap, said truck cap including a support flange engaging said ledge, said clamp including a first clamping means for holding the support flange against said ledge and a second clamping means for resisting sliding movement of said support flange relative to said ledge, said first clamping means including:

a first member having a clamping part for engaging said support flange;

a second member having a clamping part for engaging one side of said ledge; and an adjustment means connecting said first and second members, for moving said first member clamping part and said second member clamping part toward and away from one another, said second clamping means including:

an engagement part for engaging another side of said ledge to inhibit sliding movement of said support flange relative to said ledge; and a pad disposed between said first member clamping part and said support flange, said pad having an interlocking means, when said pad is clamped, for engaging said support flange to inhibit movement of said cap relative to said pad;

whereby adjustment of said adjustment means in a clamping direction moves said first member clamping part and said second member clamping part toward one another into a clamped position, clamping said pad, said support flange, and said ledge therebetween, and adjustment of said adjustment means in a release direction moves said first member clamping part and said second member clamping part away from one another into a disengaged position, thereby disengaging said clamp, said pad having an irregular surface for mating with said first member clamping part, said irregular surface being recessed between two flanges.

6. Clamp as set forth in claim 5, said adjustment means comprised of a threaded rod extending from said first member to said second member.

7. Clamp as set forth in claim 5, said interlocking means including a channel defined by said pad, said channel being adapted to receive said support flange.

8. Clamp as set forth in claim 5, said second clamping member carrying said engagement part, said engagement part being disposed relative to said truck bed so as to engage a surface of said ledge facing inwardly toward said truck bed when said clamp is in a clamped position.

9. A clamp for securing a removable truck cap to a bed of a pick-up truck, said bed including a ledge supporting a support flange on the truck cab, said ledge including a lip projecting from the ledge, said clamp including a pair of clamping members, a pair of clamping shoes, each of the shoes being mounted on one of said members such that the clamping shoe of one member opposes the clamping shoe of the other member, adjustable fastening means interconnecting said members for moving the members relative to one another whereby adjustment of the fastening means moves the clamping shoes toward or away from another, and a clamping pad between the shoes, said clamping pad having a groove for receiving said lip extending from the ledge of the truck to thereby orient the pad relative to the ledge, said clamping members and their shoes being movable relative to the clamping pad in a direction transverse to the movement of the clamping shoes toward and away from one another, to thereby permit the adjustable fastening means to move one of said members into engagement with the clamping pad.

10. Clamp as set forth in claim 9, wherein said clamping pad includes a gripping surface engaged by one of said clamping shoes.

11. Clamp as set forth in claim 9, wherein said clamping pad includes projecting fingers, said fingers defining said groove.

* * * * *